United States Patent [19]

Schuch et al.

[11] 4,083,516
[45] Apr. 11, 1978

[54] REEL MOUNTING FOR RECORDING OR REPRODUCING APPARATUS

[75] Inventors: Albert Schuch, Schwechat; Harald Hohenecker, Vienna; Herbert Riegler, Vienna; Friedrich Weirich, Vienna, all of Austria

[73] Assignees: Karl Vockenhuber; Raimund Hauser, both of Vienna, Austria

[21] Appl. No.: 752,817

[22] Filed: Dec. 21, 1976

[30] Foreign Application Priority Data

Dec. 22, 1975 Austria .................................. 9731/75

[51] Int. Cl.² .......................... G03B 1/04; G11B 15/32
[52] U.S. Cl. .................................. 242/193; 242/68.3; 242/207
[58] Field of Search ................. 242/193, 194, 68–68.3, 242/205–207; 352/156

[56] References Cited

U.S. PATENT DOCUMENTS

| 2,241,232 | 5/1941 | Wittel | 242/193 X |
| 3,506,595 | 5/1950 | Horres | 242/193 |
| 3,363,852 | 1/1968 | Maxey | 242/193 |
| 3,669,384 | 6/1972 | Hathaway | 242/194 |

FOREIGN PATENT DOCUMENTS 1,216,364   12/1970   United Kingdom ................. 242/193

*Primary Examiner*—Leonard D. Christian
*Attorney, Agent, or Firm*—Montague & Ross

[57] ABSTRACT

A mounting for a supply reel and a take-up reel in a camera, projector or other recording or reproducing apparatus comprises two coaxially juxtaposed mandrels of substantially the same diameter cantilevered for independent rotation on a common support. The outer mandrel carries one or more radially retractable detents whose withdrawal from a projecting position enables the take-up reel to be fitted onto the inner mandrel and which thereafter form a stop for the supply reel, thereby preventing the two reels from contacting each other. The withdrawal of the detents, or the removal of an abutment blocking such withdrawal, may be carried out as a separate operation; alternatively, withdrawal may be blocked automatically upon the emplacement of a reel on the inner mandrel.

21 Claims, 19 Drawing Figures

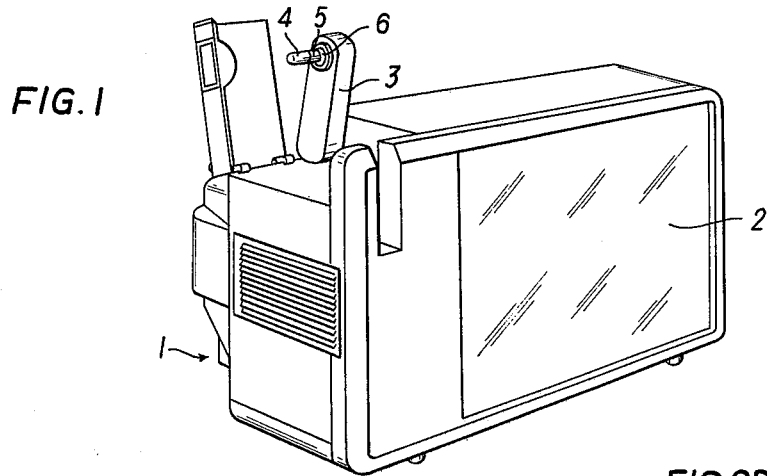
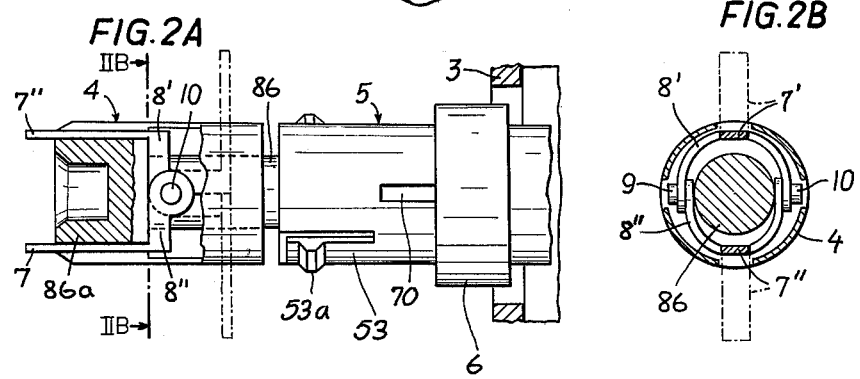
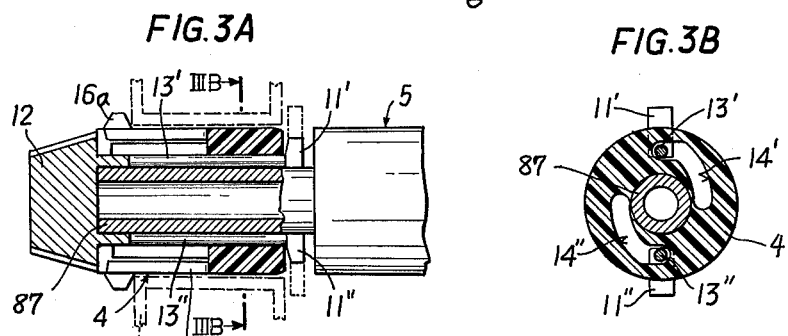
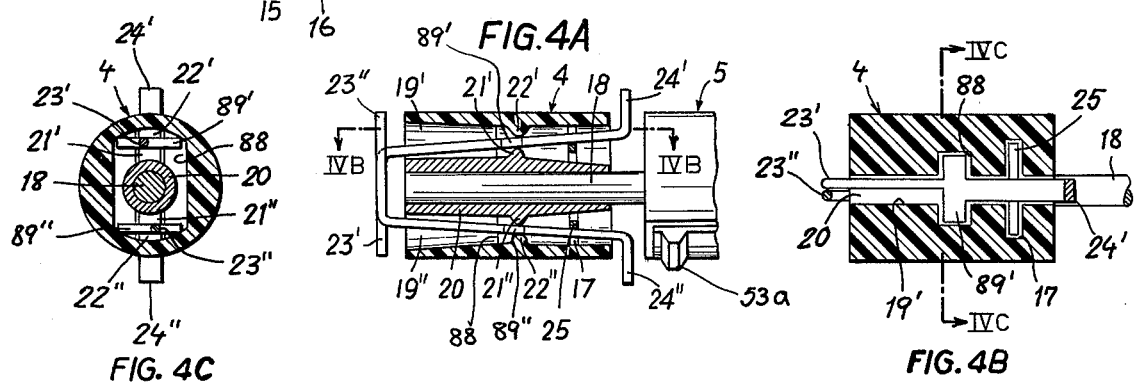

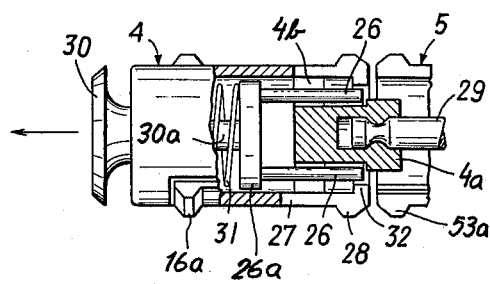
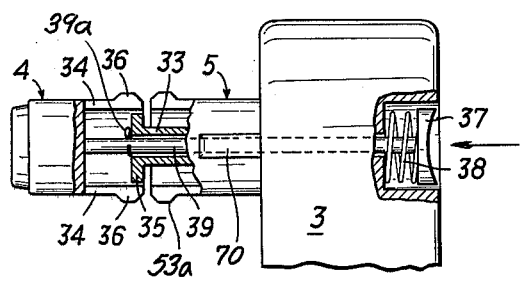
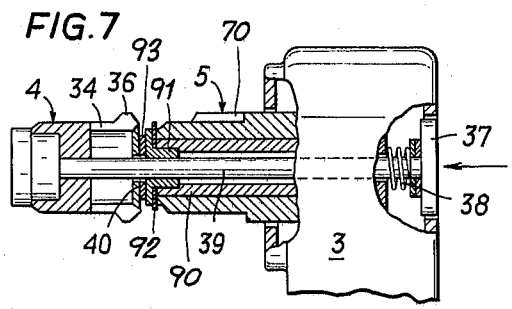
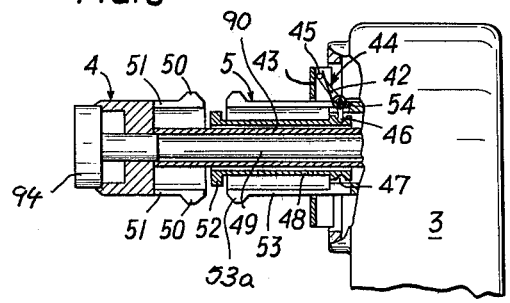
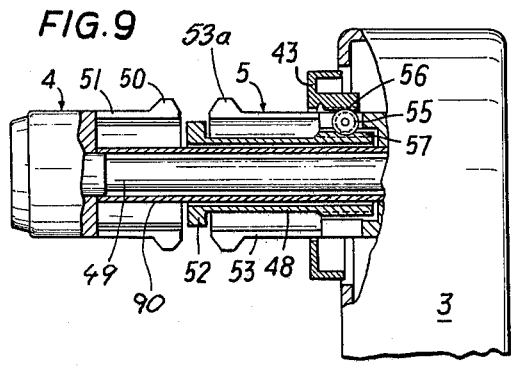

REEL MOUNTING FOR RECORDING OR REPRODUCING APPARATUS

Field of the Invention

Our present invention relates to a mounting for a pair of reels, specifically a supply reel and a take-up reel, in a recording or reproducing apparatus, such as a motion-picture camera, a movie projector or a tape recorder, handling an elongate recording medium.

BACKGROUND OF THE INVENTION

It is known to mount the two reels of such an apparatus on a pair of coaxially juxtaposed mandrels which are disposed for independent rotation on a shaft which is cantilevered on a swingable arm or other support containing a transmission for driving at least the take-up reel, usually through a slipping clutch. With a recording medium such as a tape or a film advanced at constant speed between these reels, the speeds of the supply and take-up reels progressively increase and decrease, respectively, on account of the changing radii. Thus, the two adjacent reels generally turn at different velocities and must therefore be held spaced apart in order to prevent the supply reel from being frictionally retarded or accelerated by the take-up reel with resulting overstretching or excessive ballooning of the recording medium.

In order to insure such a separation between the two reels, it has already been proposed to make the diameter of the inner mandrel (i.e. the one closer to the supporting bar) larger than that of the outer mandrel (i.e. the one near the free shaft end), either on manufacture or with the aid of an adapter slipped over the inner mandrel. This requires, of course, that the central bores of the two reels also differ in their diameters, with the result that these reels cannot be used interchangeably.

OBJECT OF THE INVENTION

The general object of our present invention is to provide an improved dual reel mounting for the purpose set forth including means for positively maintaining an axial separation between two reels carried on respective mandrels of substantially the same diameter.

A more particular object of our invention is to provide reel-separating means becoming effective only after one reel has been fitted into the inner mandrel, so as not to interfere with the emplacement of that reel.

SUMMARY OF THE INVENTION

In accordance with our present invention, a mounting of the general type referred to above includes retractable detent means carried by the mandrel-supporting shaft in the vicinity of a gap separating a first or outer mandrel from a second or inner mandrel of substantially the same diameter coaxially adjoining same, the detent means enabling emplacement of one reel on the second mandrel when in a radially withdrawn position and forming a stop for the other reel on the first mandrel when in a radially extended position.

For radially extending the withdrawn detent means, the user may operate a special actuating element after emplacement of one reel on the second mandrel; this actuating element could be an extremity of a lever arm forming a part of the detent means and lying generally axially in the withdrawn position, for example, or a rotatable knob on a member cammingly coacting with such an arm. Alternatively, the detent means may comprise one or more flexible tongues, integral with the first mandrel, each carrying a boss biased into its extended position in the path of the reel hub preferably by the inherent resiliency of the tongue. Until a reel has been fitted onto the second mandrel, the tongues yield inwardly into a clearance of the body of the mandrel to give passage to a reel sliding thereover. Once this reel is in position on the second mandrel, inward flexing of the tongues is blocked by a relative axial shift between the first mandrel and an abutment receivable in its clearance. Such a shift, of either the abutment or the first mandrel itself, may be brought about by a separate manual operation or automatically as a result of a thrust exerted by the already emplaced reel upon an axially shiftable end stop therefor. The end stop is preferably carried on the axially fixed second mandrel and may be provided with indexing means such as a resilient latch yieldably retaining it in a repressed position against a spring force urging the end stop toward the first mandrel. In an inversion of this arrangement, an abutment member integrally or otherwise linked with the end stop may normally depress the detent-forming bosses into their withdrawn position from which they are released upon a repression of the end stop by a reel fitted onto the second mandrel.

BRIEF DESCRIPTION OF THE DRAWING

The above and other features of our invention will now be described in detail with reference to the accompanying drawing in which:

FIG. 1 is a perspective view of a motion-picture projector equipped with a reel mounted according to our invention;

FIG. 2A is a side view, partly in section, of the reel mounting of FIG. 1 drawn to a larger scale, in conformity with one embodiment;

FIG. 2B is a cross-sectional view taken on the line IIB — IIB of FIG. 2A;

FIG. 3A is a view similar to FIG. 2A, showing another embodiment of our invention;

FIG. 3B is a cross-sectional view taken on the line IIIB — IIIB of FIG. 3A;

FIG. 4A is another view similar to FIG. 2A, illustrating a further embodiment;

FIG. 4B is a longitudinal sectional view taken on the line IVB — IVB of FIG. 4A;

FIG. 4C is a cross-sectional view taken on the line IVC — IVC of FIG. 4B;

FIGS. 5 – 9 are still other views similar to FIG. 2A, illustrating yet further embodiments;

Specific Description

Figure 10A:
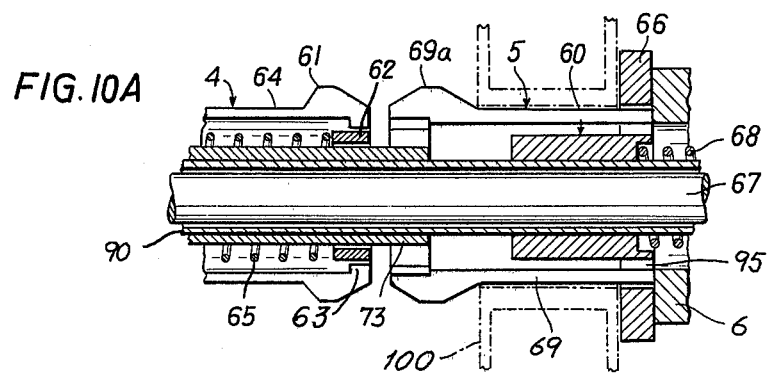
FIGS. 10A, 10B and 10C are fragmentary longitudinal sectional views of yet another embodiment as seen in respective directions XA — XA, XB — XB and XC — XC of FIG. 10D, the latter representing a perspective view of a stop member included in this embodiment.

In FIG. 1 we have shown an essentially conventional motion-picture projector 1 provided with a transluminating screen 2 and with the usual objective and light source, not shown, for imaging a film on that screen. The film, advanced by a nonillustrated transport mechanism such as a reciprocating traction claw, is continuously unwound from a supply reel and wound upon a take-up reel, the two reels (not shown in FIG. 1) being respectively carried on a pair of coaxial mandrels 4, 5 of like diameter held in a cantilevered position on a hollow supporting arm 3. A collar 6 on mandrel 5 (see also FIG. 2A) forms an axially fixed end stop for one of the reels, here specifically the take-up reel, it being assumed that arm 3 contains a transmission band for driving the mandrel 5 from a nonillustrated motor (which may be the same as that used for the film transport) by way of a friction clutch.

In FIG. 2A we have shown details of the mounting of mandrels 4 and 5 on supporting arm 3. A horizontal shaft 86, terminating in a head 86a, carries the first mandrel 4 and is freely rotatable therewith within the second mandrel 5 whose right-hand end, not shown, is rotatably journaled within arm 3. Shaft 86, supported only by mandrel 5, may thus be regarded as cantilevered on arm 3.

Figure 10B:
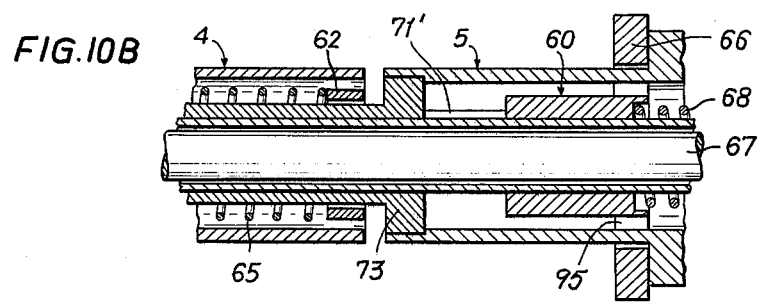
Figure 10C:
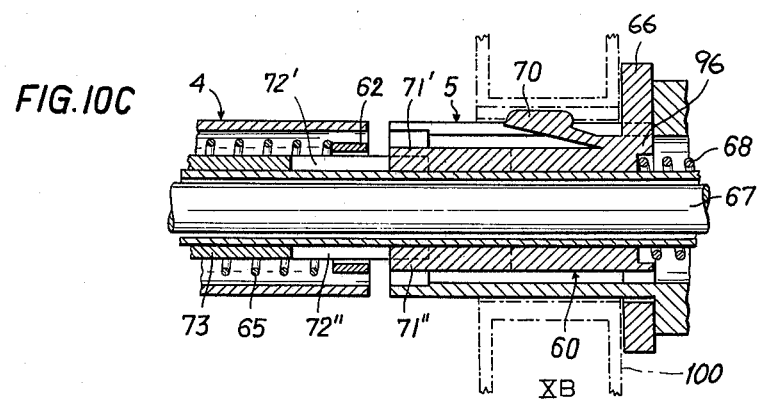
Figure 10D:
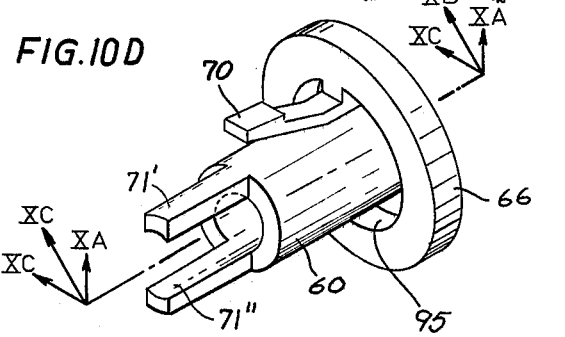

Mandrel 5 is peripherally slitted to form several axially extending tongues 53 with bosses or lugs 53a which yield inwardly when a take-up reel 100 (FIGS. 10A, 10C and 10B) is axially fitted onto this mandrel by way of the adjoining mandrel 4, the bosses 53a serving to hold the reel in position on mandrel 5 during operation when the reel is rotatingly entrained by the mandrel via a key 70.

In accordance with our present invention, mandrel 4 is provided with a pair of detent arms 7', 7" which are part of a pair of bell-crank levers also having transverse arms 8' and 8", the latter being in the shape of yokes pivoted to shaft 86 by a pair of pins 9 and 10 as best seen in FIG. 2B. In the withdrawn position of detent arms 7' and 7" shown in full lines, these arms rest horizontally and therefore parallel to the mandrel axis against head 86a in diametrically opposite slots provided for this purpose in mandrel 4: the slots are shown to extend axially from the free end of the mandrel. The axially projecting ends of arms 7' and 7" can be manually gripped for swinging the arms into an extended position, illustrated in phantom lines, in which they project radially from their slots and form a stop for a supply reel 15 (see FIG. 3A) subsequently fitted onto mandrel 4. Thus, the two reels are kept axially spaced apart so as not to interfere with each other's motion.

In FIGS. 3A and 3B the body of mandrel 4 is mounted with a friction fit on a shaft 87 again idling within mandrel 5. A milled knob 12 is rotatably carried on the free end of shaft 87 and is integral with a pair of flexible rods 13' and 13" passing through camming slots 14' and 14" in the body of mandrel 4. Rods or arms 13' and 13", which is a retracted position shown in full lines are parallel to the shaft axis, terminate in a pair of lugs 11' and 11" which lie in the gap between mandrels 4 and 5. Upon relative rotation of knob 12 and mandrel 4 through 90°, the lugs 11' and 11" are cammed radially outwardly to form stops for a supply reel 15 fitted onto mandrel 4. The reel 15 is then held between lugs 11', 11" and bosses 16a on inwardly yieldable tongues 16 which elastically retain the reel 15 in the same manner as the take-up reel is held on mandrel 5 by the tongues 53 and bosses 53a shown in FIG. 2A but omitted for simplicity's sake in FIG. 3A.

As shown in FIGS. 3A and 3B, mandrel 4 is advantageously made of plastic material; the same goes for mandrel 5. Whether synthetic resin or metal is used, tongues such as 15 and 53 will have an inherent elasticity which — together with the beveled flanks of their bosses — facilitates the insertion and removal of the reels.

In FIGS. 4A, 4B and 4C we have shown the mandrel 5 carried on an idler shaft 18 tightly surrounded by a sleeve 20 which in turn is press-fitted to the mandrel body, leaving clearances 19' and 19" therebetween. These clearances communicate with lateral recesses 88 in the mandrel body and together with these recesses accommodate a pair of rocker arms 23' and 23" terminating in substantially radial extremities 24' and 24" in the gap separating mandrels 4 and 5. Rocker arms 23', 23" have lateral wings 89', 89" extending into the recesses 88 between ridges 21', 21" of sleeve 20 and confronting ribs 22', 22" on the inner surface of the mandrel body, these ribs and ridges thus forming fulcra for the two rocker arms. A split ring 25 in another pair of recesses 17 of the mandrel body resiliently bears from within upon rocker extensions 24' and 24" to urge them radially outwardly into their stop positions. When it is desired to slide a take-up reel past the intervening gap from mandrel 4 onto mandrel 5 or vice versa, the user squeezes the overlapping front ends of rockers 23' and 23" between his fingers to withdraw the opposite extremities 24' and 24" against the force of biasing ring 25.

In FIG. 5 the mandrel 4 is secured to a shaft 29 via a hub 4a which is separated from the peripheral wall of that mandrel by a clearance bridged by a pair of webs 4b (only one shown). These webs are spaced apart by a pair of radial slots traversed by two axially extending rods 26 which are rigid with a disk 26a. A knob 30 is connected with disk 26a by a stem 30a which is surrounded by a coil spring 31 urging the rods 26 against a shoulder of hub 4a. The rods are aligned with a pair of tongues 27 carrying bosses 28 and terminating in inbent lugs 32 which overlie the ends of rods 26 in the illustrated right-hand position of the latter, thereby preventing any inward withdrawal of bosses 28. In order to facilitate such withdrawal for the purpose of inserting or removing a take-up reel, the user draws the knob 30 to the left against the force of spring 31 to disalign the rods 26 from the lugs 32, thus allowing the tongues 27 to flex inwardly into the aforementioned clearance.

In FIG. 6 the rods 26 have been replaced by a different type of abutment in the shape of a disk 35 on a sleeve 33 surrounding a shaft 39 rigid with mandrel 4. Sleeve 33 is held in an axially fixed position by being secured either to mandrel 5 or to supporting arm 3. Within a recess of that supporting arm on the side remote from the mandrels, a pushbutton 37 biased outwardly (i.e. to the right) by a spring 38 is attached to shaft 39 and can thus be depressed to move the mandrel 4 toward the left, away from mandrel 5, whereby tongues 34 of mandrel 4 with bosses 36 are disaligned from disk 35 to allow the inward camming of these bosses by a reel passing thereover.

In FIG. 7 we have shown a modification of the assembly of FIG. 6, including a bearing sleeve 90 with a cap 91 supporting the shaft 39. Mandrel 5 abuts a shoulder of cap 91 via a washer 92, that shoulder being separated by a low-friction washer 93 from an abutment disk 40 freely mounted on shaft 39. Disk 40 has a beveled rim engaged by complementarily beveled ends of tongues 34 which, upon depression of button 37 against the force of spring 38, cam the disk 40 out of the way of the tongues when the bosses 36 are pushed inwardly by a reel passing over mandrel 4.

Whereas in FIG. 6 the rightward movement of shaft 39 under pressure of spring 38 is limited by a cotter pin 39a coming to rest against disk 35, that purpose is accomplished in the mounting of FIG. 7 by the direct contact between tongues 34 and disk 40 resting against cap 91 through the intermediary of washer 93.

In the mounting of FIG. 8 a tube 90 surrounds a shaft 49 which is connected with mandrel 4 through a head 94 threaded or otherwise secured thereto. Shaft 49 slidably supports a sleeve 48 integral with an abutment disk 52. A ring 43 slidable on mandrel 5 forms an end stop for a take-up reel and is biased outwardly, i.e. toward mandrel 4, by a hairpin spring 42 acting on an arm 45 of a lever 44 which is fulcrumed on mandrel 5 by means of a pin 54 and has another arm 46 engaging in a peripheral groove 47 of sleeve 48. In the illustrated normal position of ring 43, in which no reel is mounted on mandrel 5, the axial distance of ring 43 from the retaining lugs 53a of tongues 53 is less than the width of a wheel hub so that ring 43 must be depressed toward the right, against the force of spring 42, for proper emplacement of a take-up reel on mandrel 5. This rightward movement of ring 43 results in a leftward shift of sleeve 48 whereby disk 52 enters the clearance of mandrel 4 underlying the tongues 51 to block the previously unimpeded inward displacement of bosses 50.

The assembly of FIG. 9 is similar to that of FIG. 8 except for a modified coupling between abutment sleeve 48 and end stop 43. Members 43 and 48 are here provided with respective rack teeth 56 and 57 in mesh with a pinion 55 which is rotatably mounted on mandrel 5. A biasing spring urging the disk 52 into its depicted nonblocking position has not been illustrated.

Naturally, the retaining force of tongues 53 should be greater than the thrust of biasing spring 42 in FIG. 8, and of its equivalent in FIG. 9, to prevent a spontaneous dislodgment of the take-up reel from mandrel 5.

The embodiment shown in FIGS. 10A – 10D comprises a stop member 60 slidably mounted on the tube 90 surrounding a shaft here designated 67. Member 60 has a flange 66 forming an end stop for a take-up reel 100, which in its operating position is received between that flange and retaining lugs 69a of tongues 69 integral with mandrel 5. Flange 66 is separated from the body of member 60, over the major part of its circumference, by an annular clearance 95 traversed by the peripheral wall of mandrel 5, that wall having a slot occupied by a web 96 (FIG. 10C) of which the key 70 forms an integral, resilient extension. Stop member 60 is urged toward the left, i.e. in the direction of mandrel 4, by a coil spring 68 tending to maintain a pair of prongs 71', 71" of member 60 in contact with an abutment ring 62 which embraces a guide sleeve 73 rigid with mandrel 5. Another coil spring 65 in mandrel 4, weaker than spring 68, tends to hold the ring 62 in axial alignment with inbent lugs 63 of tongues 64 underlying bosses 61. Sleeve 73 has slots 72', 72" for the axial guidance of tongues 71' and 71", respectively.

As described in connection with FIGS. 8 and 9, end stop 66 is again separated from the associated retaining lugs 69a by less than the width of a reel hub when the reel 100 is not in place. With spring 68 overriding spring 65, abutment ring 63 is then moved into a nonblocking position to the left of the one illustrated in FIGS. 10A – 10C. After the reel 100 has been emplaced, the bosses 61 of tongues 64 can no longer be cammed inwardly so that the other reel comes to rest in a position well spaced from that of reel 100.

Figure 11A:
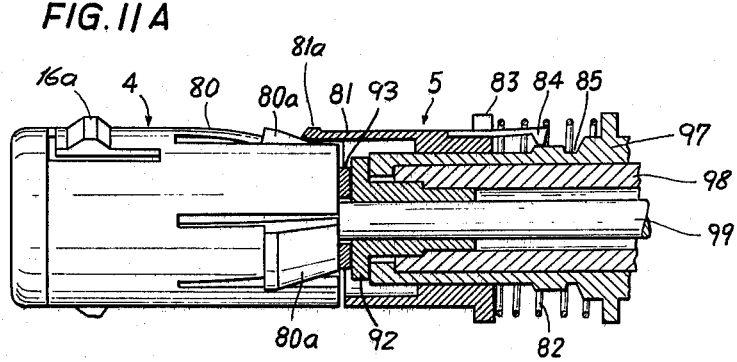
FIGS. 11A and 11B are fragmentary side views, partly in section, of an additional embodiment shown in two different positions.
Figure 11B:
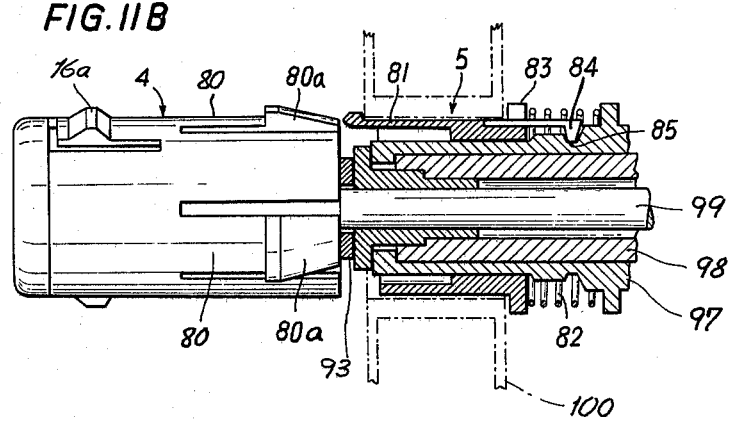

The embodiment of FIGS. 11A and 11B differs from the preceding ones in that bosses 80a of tongues 80 have steep forward flanks facing the insertion end of mandrel 4 so that these bosses cannot be cammed inwardly by a reel sliding over that mandrel. In order to facilitate the positioning of a take-up reel on mandrel 5, a stop member 83 axially shiftable on mandrel 5 is integral with a skirt 81 which is the normal position illustrated in FIGS. 11A (with reel 100 absent) coacts with the sloping rear flanks of bosses 80a to depress them inwardly far enough to give passage to a reel. Skirt 81 is axially slitted to form a small number of resilient tongues, narrower than tongues 80, with retaining lugs 81a. The holding force exerted by these retaining lugs need not be very strong since stop member 83, when repressed to the right by the insertion of reel 100, is indexed in that position by one or more resilient latch tongues 84 engaging in a groove 85 of a jacket 97 encasing a carrier tube 93 which is held separated by a bearing cap 92 from a shaft 99 rigid with mandrel 4. The holding force of latch tongue or tongues 84 must evidently be greater than the reaction pressure of spring 85 which in turn has to be sufficient to overcome the resiliency of tongues 80. Advantageously, as shown, the latch tongues 84 are so mounted on stop member 83 as to be partly overlain by the emplaced reel 100, see FIG. 11B, with resulting stiffening of these tongues. Thus, incipient removal of reel 100 from mandrel 5 will increase the flexibility of the latch tongues to enable the spring 85 to retain the stop member 83 to its normal position, shown in FIG. 11A, substantially concurrently with disengagement of the reel from its mounting.

The described latching mechanism could, of course, also be used with other embodiments such as, for example, that of FIGS. 10A – 10D.

Although the various end stops of FIGS. 8 et seq. have been shown mounted on the driven mandrel 5, it will be apparent that they could also be carried directly on supporting arm 3 with suitable modification of the linkages by which they are coupled with the associated abutment means.

We claim:

1. In an apparatus for handling an elongate recording medium unwound from a supply reel and wound upon a take-up reel, including a mounting for said supply and take-up reels, the improvement wherein said mounting comprises:

a support;

a shaft cantilevered on said support;

a first mandrel and a second mandrel coaxially juxtaposed on said shaft for independent rotation, said first mandrel being disposed adjacent a free end of said shaft, said second mandrel being inserted between said first mandrel and said support and being separated from said first mandrel by an axial gap, said mandrels being of substantially the same diameter;

retractable detent means carried by said shaft in the vicinity of said gap for selective displacement between a radially extended and a radially withdrawn position, said detent means enabling emplacement of one of said reels on said second mandrel in said withdrawn position and forming a stop for the other of said reels on said first mandrel in said extended position;

abutment means axially displaceable with reference to said first mandrel for selectively blocking said detent means in one of its said positions; and biasing means resiliently urging said detent means into said extended position.

2. The improvement defined in claim 1 wherein said biasing means comprises a flexible tongue integral with said first mandrel, said detent means including a boss on said tongue.

3. The improvement defined in claim 2 wherein said boss has a camming edge facing said free end for depression by a reel thrust onto said first mandrel upon relative displacement of said first mandrel and said abutment means into a nonblocking position.

4. The improvement defined in claim 3 wherein said abutment means comprises a spring-loaded member movable against its spring force into said nonblocking position.

5. The improvement defined in claim 4, further comprising an end stop for said one of said reels axially displaceable on said support, said end stop having an extension engageable with said member in the absence of said one of said reels from said second mandrel, and spring means bearing upon said end stop with a pressure overriding said spring force for moving said member into said nonblocking position in the absence of said one of said reels.

6. The improvement defined in claim 5 wherein said second mandrel is provided with retaining means for yieldably holding said one of said reels onto said end stop against the pressure of said spring means.

7. The improvement defined in claim 3 wherein said shaft is axially shiftable relatively to said support, jointly with said first mandrel, away from said second mandrel for disaligning said tongue from said abutment means, further comprising resilient means biasing said first mandrel toward said second mandrel to align said tongue with said abutment means.

8. The improvement defined in claim 7 wherein said abutment means is axially fixed with reference to said support.

9. The improvement defined in claim 7 wherein said abutment means is a beveled disk freely shiftable on said shaft and cammable by said tongue toward said second mandrel upon displacement of said first mandrel away from said second mandrel.

10. The improvement defined in claim 2 wherein said abutment means comprises a spring-loaded member movable by its spring force into camming engagement with said tongue for depressing said boss into its withdrawn position, in the absence of said one of said reels from said second mandrel, and an end stop for said one of said reels on said second mandrel linked with said member for disengaging the latter from said tongue upon emplacement of said one of said reels on said second mandrel with repression of said end stop against said spring force.

11. The improvement defined in claim 10 wherein said end stop is integral with said member.

12. The improvement defined in claim 10 wherein said end stop is provided with indexing means yieldably retaining said end stop in its repressed position with a holding force overriding said spring force.

13. The improvement defined in claim 12 wherein said indexing means comprises a resilient latch integral with said second mandrel positioned to be partially overlain by said one of said reels in a position in which the reel contacts said end stop.

14. The improvement defined in claim 2, further comprising an end stop for said one of said reels axially displaceable on said support, said end stop being operatively coupled with said abutment means for moving the latter into its blocking position upon emplacement of said one of said reels on said second mandrel with repression of said end stop.

15. The improvement defined in claim 14, further comprising spring means bearing upon said end stop in a direction toward said free end, thereby urging said abutment means toward said nonblocking position.

16. The improvement defined in claim 15 wherein the coupling between said end stop and said abutment means comprises a two-armed lever fulcrumed on said second mandrel and engaged by said spring means.

17. The improvement defined in claim 14 wherein the coupling between said end stop and said abutment means comprises a pinion journaled on said second mandrel, said end stop and said abutment means being provided with rack teeth in mesh with said pinion.

18. In an apparatus for handling an elongate recording medium unwound from a supply reel and wound upon a take-up reel, including a mounting for said supply and take-up reels, the improvement wherein said mounting comprises:
   a support;
   a shaft cantilevered on said support;
   a first mandrel and a second mandrel coaxially juxtaposed on said shaft for independent rotation, said first mandrel being disposed adjacent a free end of said shaft and being provided with a slot extending axially from said free end, said second mandrel being inserted between said first mandrel and said support and being separated from said first mandrel by an axial gap, said mandrels being of substantially the same diameter; and
   a bell-crank lever with a first arm and a second arm swingable through about 90° between an extended position and a withdrawn position, said second arm being pivoted to said shaft within said first mandrel, said first arm lying substantially parallel to the axis of said mandrels within said slot in said withdrawn position to facilitate emplacement of one of said reels on said second mandrel, said first arm extending radially from said slot in said extended position to form a stop in the vicinity of said gap for the other of said reels on said first mandrel.

19. The improvement defined in claim 18 wherein said first arm has a tip projecting endwise from said slot in said withdrawn position to facilitate a swinging of said bell-crank lever into said extended position.

20. In an apparatus for handling an elongate recording medium unwound from a supply reel and wound upon a take-up reel, including a mounting for said supply and take-up reels, the improvement wherein said mounting comprises:
   a support;
   a shaft cantilevered on said support;
   a first mandrel and a second mandrel coaxially juxtaposed on said shaft for independent rotation, said first mandrel being disposed adjacent a free end of said shaft, said second mandrel being inserted between said first mandrel and said support and being separated from said first mandrel by an axial gap, said mandrel being of substantially the same diameter;
   retractable detent means carried by said shaft in the vicinity of said gap for selective displacement between a radially extended and a radially withdrawn position to enable emplacement of one of said reels on said second mandrel in said withdrawn position and to form a stop for the other of said reels on said first mandrel in said extended position, said detent means including an arm lying substantially parallel to the axis of said mandrels; and an actuating member connected with said arm and carried on said shaft for rotation relative to said first mandrel about said axis, said first mandrel being provided with cam means engaging said arm for radially displacing same upon such relative rotation.

21. In the apparatus for handling an elongate recording medium unwound from a supply reel and wound upon a take-up reel, including a mounting for said supply and take-up reels, the improvement wherein said mounting comprises:

a support;

a shaft cantilevered on said support;

a first mandrel and a second mandrel coaxially juxtaposed on said shaft for independent rotation, said first mandrel being disposed adjacent a free end of said shaft, said second mandrel being inserted between said first mandrel and said support and being separated from said first mandrel by an axial gap, said mandrels being of substantially the same diameter; and retractable detent means carried by said shaft in the vicinity of said gap for selective displacement between a radially extended and a radially withdrawn position, said detent means enabling emplacement of one of said reels on said second mandrel in said withdrawn position and forming a stop for the other of said reels on said first mandrel in said extended position, said detent means including at least one swingable arm lying substantially parallel to the axis of said mandrels alongside said shaft in said withdrawn position, said first mandrel being provided with an internal clearance and with a fulcrum for said arm within said clearance, said arm projecting generally axially from said clearance on opposite ends of said first mandrel and terminating in a substantially radial extremity within said gap.

* * * * *